June 7, 1938.　　　H. G. BROKERING　　　2,119,520
BOLT OR PIN AND RETAINING MEMBER

Filed July 20, 1936

INVENTOR
HARRY G. BROKERING
BY Robert V. Laughlin
and Clade Koontz
ATTORNEYS

Patented June 7, 1938

2,119,520

UNITED STATES PATENT OFFICE 2,119,520

BOLT OR PIN AND RETAINING MEMBER

Harry G. Brokering, Dayton, Ohio

Application July 20, 1936, Serial No. 91,570

6 Claims. (Cl. 85—5)

(Granted under the act of March 3, 1883, as amended April 30, 1928; 370 O. G. 757)

This invention relates to fastening devices and in more particular to a bolt or pin and a retaining member attached to one end thereof.

An object of this invention is to provide a new and novel pin, adapted to receive a retaining member inserted with a small amount of effort.

Another object of this invention is to provide a retaining member that is easily manufactured, made from sheet metal at a low cost; but at the same time efficient and dependable.

Another object of this invention is to provide a flexible retaining member so split that it is easily flexed while being inserted on the bolt.

Another object of this invention is to provide spacers that are seated in spaced annular channels and insertable longitudinally on the pin.

Other objects and advantages reside in the construction of parts, the combinations thereof and the mode of operation, as will become more apparent from the following description.

Figure 1:
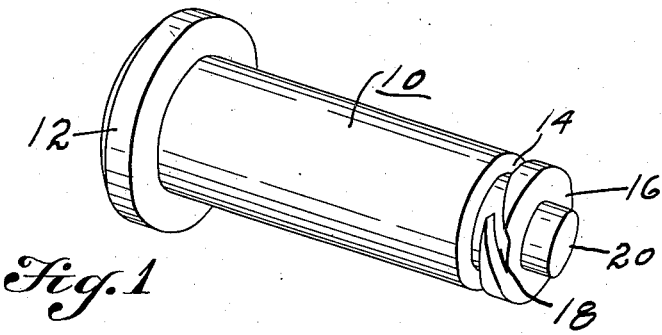
Fig. 1 is a perspective view of the bolt or pin before assembly.

In the past it has been common practice to either use nuts or cotter pins in retaining bolts in position. In addition thereto, numerous other attempts have been made using trick devices which generally are impractical excepting possibly for special uses. A nut serves the purpose very well where large forces are exerted parallel to the axis of the bolt. Likewise, nuts are very satisfactory where they are readily put into position and when in position there is no vibration to jar the bolt, so that there is no tendency for the nut to loosen. In other installations a nut is not quite as satisfactory, especially where the parts held together by the bolt are subjected to movements. In some of these installations it is necessary to either use a lock-nut or a cotter pin. A lock-nut is expensive and therefore where it is desirable to hold the cost down, as in the manufacture of farm machinery, washing machines, chain belts and the like, cotter pins are frequently resorted to. The cotter pin is inserted through a hole in the bolt and the forked ends deflected or bent to retain the cotter pin in position. An objection to the cotter pins is the ease with which these are sheared. Furthermore, when it is desirable to remove the cotter pin the bight of the pin may be worn, or the ends jammed, so that it is almost impossible to remove the cotter pin when it is desirable to disassemble the parts to replace or repair the parts of the device.

In the present embodiment disclosed in the drawing, a retaining member made of sheet material has been provided, which has the desirable qualities of both a nut and a cotter pin and additional qualities found in neither one.

Referring to the drawing, the bolt or pin 10, which may be provided with any suitable shaped head 12, is provided with an annular groove 14 near one end thereof, which groove is located between the body portion of the bolt 10 and an annular collar-like portion 16.

This collar-like portion 16 is provided with a diagonal slot 18, the depth of which corresponds to the depth of the groove 14. It is necessary to have only one diagonal slot 18 throughout the entire periphery of the collar 16. The end of the bolt has a suitable pilot portion 20. Although this pilot portion is not absolutely essential, it does have desirable features for some types of work.

When the bolt has been inserted in position, a retaining member 22, similar to a lock-washer in structure, which may be either round, oval or any other suitable shape, is inserted in the groove 14 to hold the bolt 10 in position.

Member 22 is provided with a round hole 24. One side of the hole 24 is slotted at 26, thereby providing a pair of flexible portions 28 and 30, so that one flexible portion may be inserted into the diagonal slot 18, at which time member 22 may be rotated, thereby advancing into the groove 14, the advanced portion 28 leading the way. When member 22 has thus rotated more than one complete revolution it is locked in the groove 14. When once in this position, the portions 28 and 30 spring into alignment so that member 22 lies entirely within the plane.

After being inserted, member 22 will not come off unless the end portion 30 is flexed by an external force and aligned with the inner end of the diagonal slot 18. Under normal operating conditions this will never take place. The retaining member 22 will remain in position until it is either removed or physically worn out, or subjected to forces which cause its failure. It will not come off like a cotter pin. The ends will not be jammed like a cotter pin. It will not loosen like a nut. When once put into position it stays there. It may be manually removed by flexing the end portion 30 and rotating member 22 in a direction opposite to the direction of rotation when inserted into position. Thus, the assembly permits the removal of the parts and quite readily.

The pilot portion 20 centers the hole 24 of member 22 with respect to the groove 14, so as to facilitate the insertion of member 22. The diameter of the pilot portion 20 is preferably slightly less than the diameter of the material across the bottom of the groove 14. As already stated, the pilot portion 20 is not absolutely essential and may be dispensed with where there is not sufficient clearance to permit the use of such a pilot portion. On the other hand, where there is sufficient clearance and it is desirable to have the retaining member inserted with the minimum amount of effort, the pilot portion will greatly aid in accomplishing this result. The pilot portion is duo-functional. In addition to the function as a pilot or guide, it also supports the trailing end of the retaining member while it begins to enter the diagonal slot. The reduction of the diameter permits the use of a retaining member slightly greater than the diameter of the groove.

Figure 2:
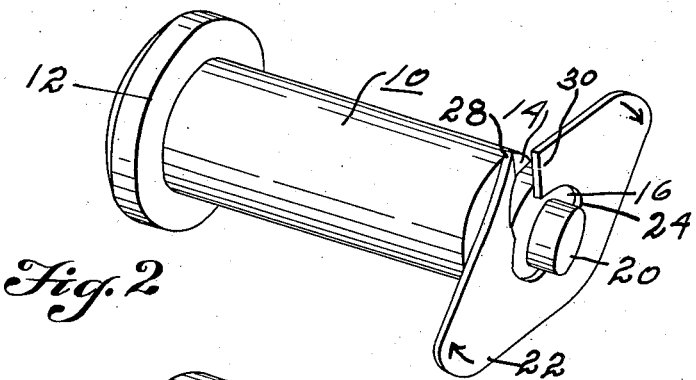
Fig. 2 is a perspective view showing a step in assembly.
Figure 3:
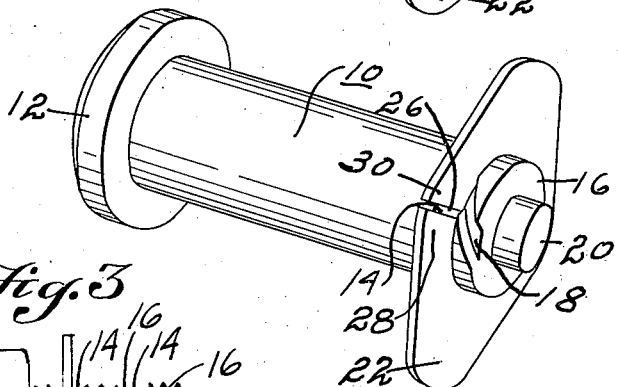
Fig. 3 is a perspective view of the parts when assembled.

Several grooves 14 arranged in spaced relation by collars 16 may be made on the same pin, the retaining member or members 22 being passed from one groove to the next in a manner similar to the insertion of the retaining member 22 shown in Figs. 2 and 3. Such a structure permits the use of members 22 as spacers between parts.

Figure 4:
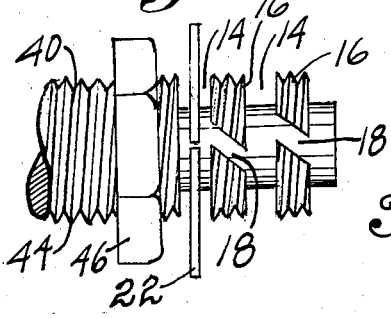
Fig. 4 is a fragmentary perspective view of another modification.

In Fig. 4 a bolt 40 threaded at 44 is provided with several grooves 14 and collar-like portions 16 adjacent the grooves. The bolt 40 is provided with threads 44 which permit the use of a nut 46. When the nut 46 has been positioned, retaining member 22 may be inserted into the groove 14 closest to the nut 46 to prevent the removal of the nut.

Such an assembly may be used in numerous places where the greatest amount of safety is required, such as devices used in travel on land, sea and in the air, which includes inter alia trains and railroad tracks, motor vehicles, buses, ocean going vessels and aircraft both lighter and heavier than air. In addition to the above, the devices disclosed herein may be used in numerous other places.

Although the preferred modification of the device has been described, it will be understood that within the purview of this invention various changes may be made in the form, details, proportion and arrangement of parts which, generally stated, consist in a device capable of carrying out the objects set forth, in the novel parts, combination of parts and mode of operation, as disclosed and defined in the appended claims.

This application is filed under the provisions of the act of April 30, 1928. The invention described herein, if patented, may be manufactured and used by or for the Government for governmental purposes without the payment to the inventor of any royalty thereon.

Having thus described my invention, I claim:

1. A fastening device of the character described including a pin having a cylindrical body portion and a collar-like portion arranged in spaced relation from said cylindrical body portion, said collar-like portion and body portion forming an annular groove, said collar-like portion having a diagonally disposed notch extending from one end of the pin to the groove, the cylindrical portion and the collar-like portion being provided with peripheral threads, and a flexible retaining member having a hole and one side slotted from the hole to the periphery thereof, said retaining member being insertable by deflecting the portions abutting the slot and passing one of said last mentioned portions into the notch and seating the retaining member in said groove by being passed into position by rotation through the notch.

2. A fastening device of the character described including a pin having a body portion and a collar-like portion cooperating to form an annular groove adjacent one end thereof and spaced therefrom by said collar-like portion, said collar-like portion having a diagonally disposed notch extending from the end of the pin to the groove, said pin having a second groove adjacent said first groove and spaced therefrom by a second collar-like portion also having a diagonally disposed notch extending from the first groove to the second groove, said collar-like portions and said body portion being externally threaded for the reception of a threaded nut, and a flexible retaining member having a hole and a slit from the hole extending to one side of the periphery of said member, said retaining member being insertable into one of said grooves by deflecting the portions adjacent the slit and advancing the retaining member into said groove by threading through either one or both notches depending upon which groove seats the retaining member.

3. A fastening device of the character described including a pin having a body portion and a collar-like portion spaced from each other so as to cooperate to form an annular groove, a duo-functional pilot portion of reduced diameter extending beyond the collar-like portion, said collar-like portion having a diagonally disposed notch extending from one side to the other, the diameter of the collar-like portion being the same as that of the body portion, and a flexible retaining member having a hole and one side slotted from the hole to the periphery thereof, said retaining member being guided into position by the pilot portion and insertable by positioning upon the pilot portion and deflecting the portions abutting the slot, passing one end of said last mentioned portion into the notch in the annular groove and seating the retaining member in said groove by passing into position by rotation through the notch the trailing portion of the retaining member being supported upon the pilot portion when passing said one end through the notch.

4. A fastening device of the character described including a pin having a body portion and a collar-like portion spaced from each other so as to cooperate to form an annular groove adjacent one end thereof and spaced therefrom by said collar-like portion, said collar-like portion having a diagonally disposed notch extending from the end of the pin to the groove, said collar-like portion having a diameter equal to that of the body portion, a duo-functional pilot portion on the end of the pin, and a flexible retaining member having a hole and one side slotted from the hole to the periphery thereof, said retaining member being guided into position by the pilot portion and insertable by deflecting the portions abutting the slot and passing one of said last mentioned portions into the notch and seating the retaining member in said groove by being passed into position by rotation through the notch, the trailing portion of the retaining member being supported upon the pilot portion while the retaining member enters the notch.

5. A fastening device of the character described including a pin having a body and a collar-like portion spaced from each other so as to cooperate to form an annular groove adjacent one end thereof and spaced therefrom by said collar-like portion, said collar-like portion having a diagonally disposed notch extending from the end of the pin to the groove, said pin having a second groove adjacent said first groove and spaced therefrom by a second collar-like portion also having a diagonally disposed notch extending from the first groove to the second, a duo-functional pilot portion on the end of the pin, said collar-like portions having maximum diameters substantially equal to that of said body portion, and a flexible retaining member having a hole and a slit from the hole extending to one side of the periphery of said member, said retaining member being guided into position by the pilot portion and insertable into one of said grooves by deflecting the portions adjacent the slit and advancing the retaining member into said groove by threading through either one or both notches depending upon which groove seats the retaining member, the trailing portion of the retaining member being supported upon the pilot portion while the retaining member enters the first notch.

6. A fastening device of the character described including a pin having a body portion and a collar-like portion spaced from each other so as to cooperate to form an annular groove adjacent one end thereof and spaced therefrom by said collar-like portion, said collar-like portion having a diagonally disposed notch extending from the end of the pin to the groove, said collar-like portion having a diameter equal to that of the body portion, a duo-functional pilot portion on the end of the pin, and a retaining member having a hole and one side slotted from the hole to the periphery thereof, said retaining member being guided into position by the pilot portion and insertable by passing one of the portions of the retaining member, adjacent the slot, into the notch and seating the retaining member in said groove by being passed into position by rotation through the notch, the trailing portion of the retaining member being supported upon the pilot portion while the retaining member enters the notch.

HARRY G. BROKERING.